US012674779B2

(12) United States Patent
Nara et al.

(10) Patent No.: US 12,674,779 B2
(45) Date of Patent: Jul. 7, 2026

(54) ULTRASONIC INSPECTION OF JOINED PORTIONS OF PACKAGING CONTAINERS

(71) Applicant: YAMAHA FINE TECHNOLOGIES CO., LTD., Hamamatsu (JP)

(72) Inventors: Akihiro Nara, Hamamatsu (JP); Hideyuki Yamada, Hamamatsu (JP); Takao Koyama, Hamamatsu (JP)

(73) Assignee: YAMAHA FINE TECHNOLOGIES CO., LTD., Hamamatsu (JP)

( * ) Notice: Subject to any disclaimer, the term of this patent is extended or adjusted under 35 U.S.C. 154(b) by 289 days.

(21) Appl. No.: 18/516,188

(22) Filed: Nov. 21, 2023

(65) Prior Publication Data

US 2024/0085380 A1      Mar. 14, 2024

Related U.S. Application Data

(63) Continuation of application No. PCT/JP2022/021255, filed on May 24, 2022.

(30) Foreign Application Priority Data

May 31, 2021      (JP) ................................. 2021-090827

(51) Int. Cl.
*G01N 29/04* (2006.01)
*B31B 50/00* (2017.01)
(Continued)

(52) U.S. Cl.
CPC ........... *G01N 29/04* (2013.01); *B31B 50/006* (2017.08); *B31B 70/006* (2017.08); *B65B 51/00* (2013.01);
(Continued)

(58) Field of Classification Search
CPC ...... G01N 29/04; G01N 29/043; G01N 29/11; G01N 29/22; G01N 29/221; G01N 29/223;
(Continued)

(56) References Cited

U.S. PATENT DOCUMENTS 3,028,752 A      4/1962   Bacon
3,121,324 A  *  2/1964   Cowan ................. G01N 29/265
                                                              73/622
(Continued)

FOREIGN PATENT DOCUMENTS

DE         19852719 A1 *  6/1999   ............. G01B 17/02
EP         2568469 A1      3/2013
(Continued)

OTHER PUBLICATIONS

Translation JP_2004191143 (Year: 2004).*
(Continued)

*Primary Examiner* — Peter J Macchiarolo
*Assistant Examiner* — Monica S Young
(74) *Attorney, Agent, or Firm* — ROSSI, KIMMS & McDOWELL LLP

(57)                    ABSTRACT

An ultrasonic inspection device is used for inspecting a packaging container having a joined portion including overlapping and joined edges of the packaging container. The ultrasonic inspection device includes a transmitter configured to irradiate ultrasonic waves toward at least a base end portion of the joined portion in a state in which the joined portion protrudes from a surface of an object in a direction orthogonal to the surface, the base end portion being positioned on a side of the object. The ultrasonic inspection device further includes a plurality of receivers configured to receive the ultrasonic waves transmitted through the joined portion.

7 Claims, 9 Drawing Sheets

(51) Int. Cl.

| | |
|---|---|
| *B31B 70/00* | (2017.01) |
| *B65B 51/00* | (2006.01) |
| *B65B 57/02* | (2006.01) |
| *G01N 29/11* | (2006.01) |
| *G01N 29/22* | (2006.01) |
| *G01N 29/34* | (2006.01) |
| *G01N 29/36* | (2006.01) |

(52) U.S. Cl.
CPC ........... *B65B 57/02* (2013.01); *G01N 29/043* (2013.01); *G01N 29/11* (2013.01); *G01N 29/22* (2013.01); *G01N 29/34* (2013.01); *G01N 29/36* (2013.01); *B65B 2220/08* (2013.01); *G01N 29/221* (2013.01); *G01N 29/223* (2013.01); *G01N 2291/023* (2013.01); *G01N 2291/0231* (2013.01); *G01N 2291/048* (2013.01); *G01N 2291/051* (2013.01); *G01N 2291/102* (2013.01); *G01N 2291/103* (2013.01); *G01N 2291/106* (2013.01); *G01N 2291/2695* (2013.01)

(58) Field of Classification Search
CPC .. G01N 29/34; G01N 29/36; G01N 2291/023; G01N 2291/0231; G01N 2291/2695; G01N 2291/106; G01N 2291/103; G01N 2291/102; G01N 2291/051; G01N 2291/048; B31B 50/006; B31B 70/006; B65B 51/00; B65B 57/02; B65B 2220/08
USPC .......................................................... 73/632
See application file for complete search history.

(56) References Cited

U.S. PATENT DOCUMENTS

| | | | |
|---|---|---|---|
| 4,862,748 A | | 9/1989 | Woodmansee |
| 5,203,869 A | | 4/1993 | Bashyam |
| 5,372,042 A | | 12/1994 | Jarman et al. |
| 2003/0154801 A1* | | 8/2003 | Georgeson ............. G01N 29/11 |
| | | | 73/799 |

| | | | | |
|---|---|---|---|---|
| 2004/0083814 A1 | | 5/2004 | Lehmann et al. | |
| 2004/0129081 A1* | | 7/2004 | Stauffer .................... G01L 3/24 |
| | | | | 73/644 |
| 2005/0115324 A1* | | 6/2005 | Stauffer ................. G01N 29/28 |
| | | | | 73/617 |
| 2005/0126294 A1* | | 6/2005 | Bossi .................... G01N 29/221 |
| | | | | 73/629 |
| 2020/0049663 A1 | | 2/2020 | Nara | |

FOREIGN PATENT DOCUMENTS

| | | | | |
|---|---|---|---|---|
| JP | | H07260747 A | | 10/1995 |
| JP | | H10277038 A | | 10/1998 |
| JP | | 2003254947 A | | 9/2003 |
| JP | | 2004191143 A | * | 7/2004 |
| JP | | 2004233144 A | | 8/2004 |
| JP | | 2006504934 A | | 2/2006 |
| JP | | 2020027012 A | | 2/2020 |
| WO | | 2004040293 A1 | | 5/2004 |

OTHER PUBLICATIONS

Translation DE_19852719 (Year: 1999).*
Extended European Search Report issued in European Appln. No. 22815914.1 mailed Apr. 4, 2025.
Office Action issued in Chinese Appln. No. 202210597723.9 mailed on Jul. 30, 2025. English machine translation provided.
Office Action issued in Korean Appln. No. 10-2023-7038141 mailed on Aug. 13, 2025. English machine translation provided.
English translation of Written Opinion issued in Intl. Appln. No. PCT/JP2022/021255, mailed Jul. 26, 2022, previously cited in IDS filed Nov. 21, 2023.
International Search Report issued in Intl. Appln. No. PCT/JP2022/021255 mailed Jul. 26, 2022. English translation provided.
Written Opinion issued in Intl. Appln. No. PCT/JP2022/021255 mailed Jul. 26, 2022.
Office Action issued in Japanese Appln. No. 2021-090827 mailed on May 20, 2025. English machine translation provided.
Second Office Action issued in Chinese Appln. No. 202210597723.9 mailed Jan. 22, 2026. English machine translation provided.
Third Office Action issued in Chinese Appln. No. 202210597723.9 mailed May 1, 2026. English machine translation provided.

* cited by examiner

FIG. 6

ULTRASONIC INSPECTION OF JOINED PORTIONS OF PACKAGING CONTAINERS

CROSS-REFERENCE TO RELATED APPLICATIONS

The present application is a continuation application of International Application No. PCT/JP2022/021255, filed May 24, 2022, which claims priority to JP Patent Application No. 2021-090827, filed May 31, 2021. The contents of these applications are incorporated herein by reference.

BACKGROUND

Technical Field

The present disclosure relates to an ultrasonic inspection device.

BACKGROUND ART

Conventionally, there are packaging containers in which a storage space is formed inside by overlapping and joining the edges of container members such as sheet members and cup-shaped members. In such a packaging container, the joined portion of the container member extends to the outside of the storage space with respect to the non-joined portion of the container member that is not joined and constitutes the storage space.

Japanese Unexamined Patent Application, First Publication No. 2020-027012 discloses an ultrasonic inspection device for inspecting peeling at the joined portion of container members. This type of ultrasonic inspection device has a transmission unit that emits ultrasonic waves, and determines whether or not peeling has occurred at the joined portion, by receiving and analyzing the ultrasonic waves emitted from the transmission unit and having transmitted through the joined portion. In a conventional ultrasonic inspection device, ultrasonic waves are emitted from the transmission unit toward the joined portion, in a direction in which edges of container members overlap at the joined portion.

SUMMARY OF INVENTION

In some cases, the joined portion of a container member is ultrasonically inspected in a state in which the joined portion of the container member protrudes from the surface of the predetermined object in a direction orthogonal to the surface. The predetermined object may be for example, a non-joined portion of a container member that constitutes a storage space of a packaging container, or a base for supporting the packaging container in an apparatus for manufacturing the packaging container (for example, a pillow packaging machine) or in an apparatus for transporting the packaging container. However, when the transmission unit is placed on the surface of a predetermined object so as to emit the ultrasonic waves in the direction in which the edges of the container member overlap at the joined portion (that is, the direction along the surface of the predetermined object) as in the conventional art, it is difficult for the ultrasonic waves emitted from the transmission unit to reach the base end portion of the joined portion protruding from the predetermined object, which is positioned on the side of the predetermined object. For this reason, it is difficult for the conventional ultrasonic inspection device to accurately inspect peeling of the container members at the joined portion of the packaging container.

This disclosure has been made in view of the circumstances described above. An example object of the present disclosure is to provide an ultrasonic inspection device capable of accurately inspecting peeling of container members at a joined portion, even when the joined portion protrudes from the surface of a predetermined object in a direction orthogonal to the surface.

A first aspect of the present disclosure is an ultrasonic inspection device for inspecting a packaging container having a joined portion including overlapping and joined edges of the packaging container. The ultrasonic inspection device includes a transmitter configured to irradiate ultrasonic waves toward at least a base end portion of the joined portion in a state in which the joined portion protrudes from a surface of an object in a direction orthogonal to the surface, the base end portion being positioned on a side of the object. The ultrasonic inspection device further includes a plurality of receivers configured to receive the ultrasonic waves transmitted through the joined portion.

BRIEF DESCRIPTION OF THE DRAWINGS

FIG. 6 is a cross-sectional view schematically showing another usage example of an ultrasonic inspection device according to the first embodiment.

DETAILED DESCRIPTION OF THE EMBODIMENTS

First Embodiment

A first embodiment of the present disclosure will be described below with reference to FIG. 1 to FIG. 4.

Figure 1:
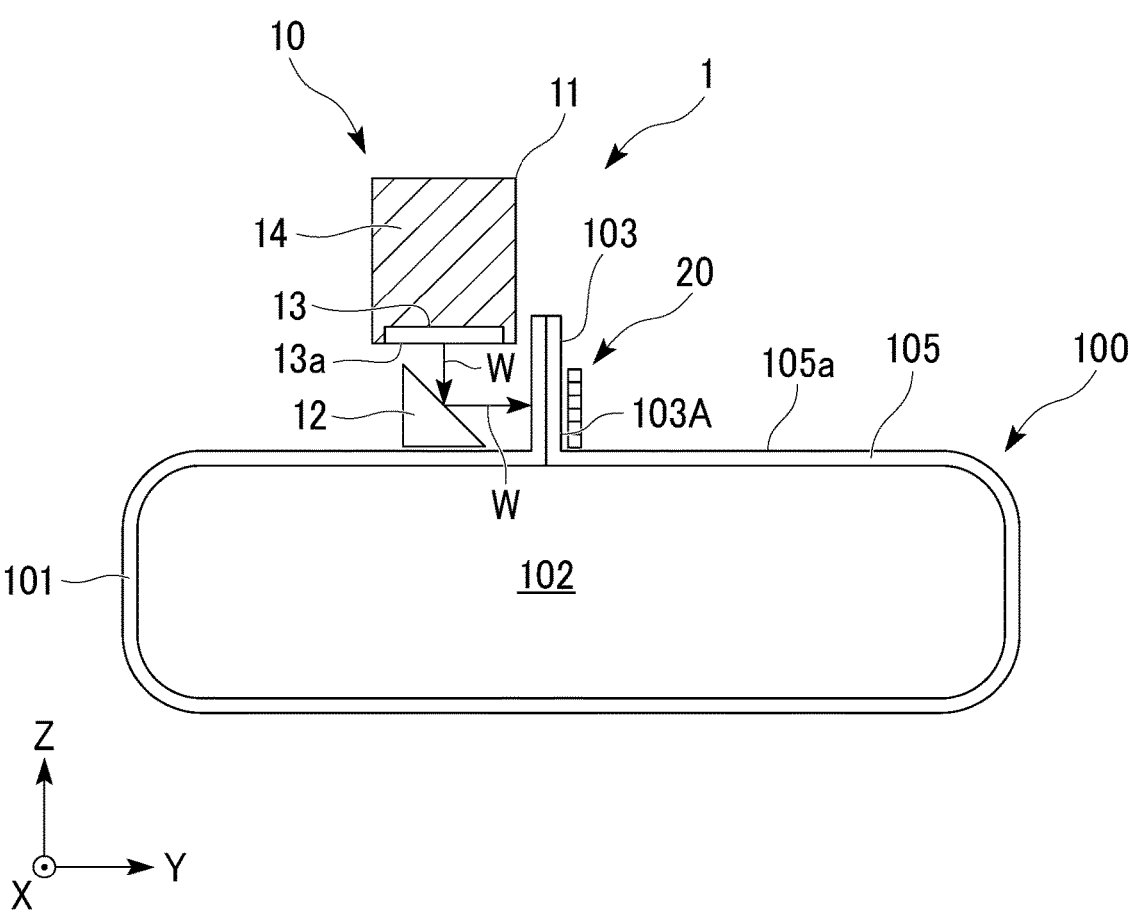
FIG. 1 is a cross-sectional view schematically showing an ultrasonic inspection device according to one embodiment.

As shown in FIG. 1, an ultrasonic inspection device 1 of this embodiment utilizes ultrasonic waves W to inspect a packaging container 100. The packaging container 100 according to the present embodiment is a container in which a storage space 102 is formed inside by overlapping and joining edges of sheet-shaped container members 101. The illustrated packaging container 100 is composed of one container member 101, but may be composed of two container members 101, for example. The ultrasonic inspection device 1 inspects peeling of the container member 101 at a joined portion 103 of the packaging container 100 where the container members 101 are overlapped and joined. In the following description, the part of the packaging container 100 among the container members 101 that form the accommodation space 102 and are not joined, is called a non-joined portion 105.

When inspecting the packaging container 100 with the ultrasonic inspection device 1, the joined portion 103 is protruded from an outer surface 105a (the surface of a predetermined object (object)) of the non joined portion 105 in a direction orthogonal to the outer surface 105a. The protruding direction of the joined portion 103 need not be strictly orthogonal to the outer surface 105a of the non-joined portion 105, and may be slightly inclined.

In the drawing, the direction in which the container members 101 overlap at the joined portion 103 is indicated by the Y-axis direction. Also, the direction in which the joined portion 103 protrudes from the outer surface 105a of the non joined portion 105 is defined as the width direction of the joined portion 103, and is indicated by the Z-axis direction. Moreover, the direction orthogonal to the Z-axis direction and the Y-axis direction is defined as the longitudinal direction of the joined portion 103, and is indicated by the X-axis direction.

Figure 2:
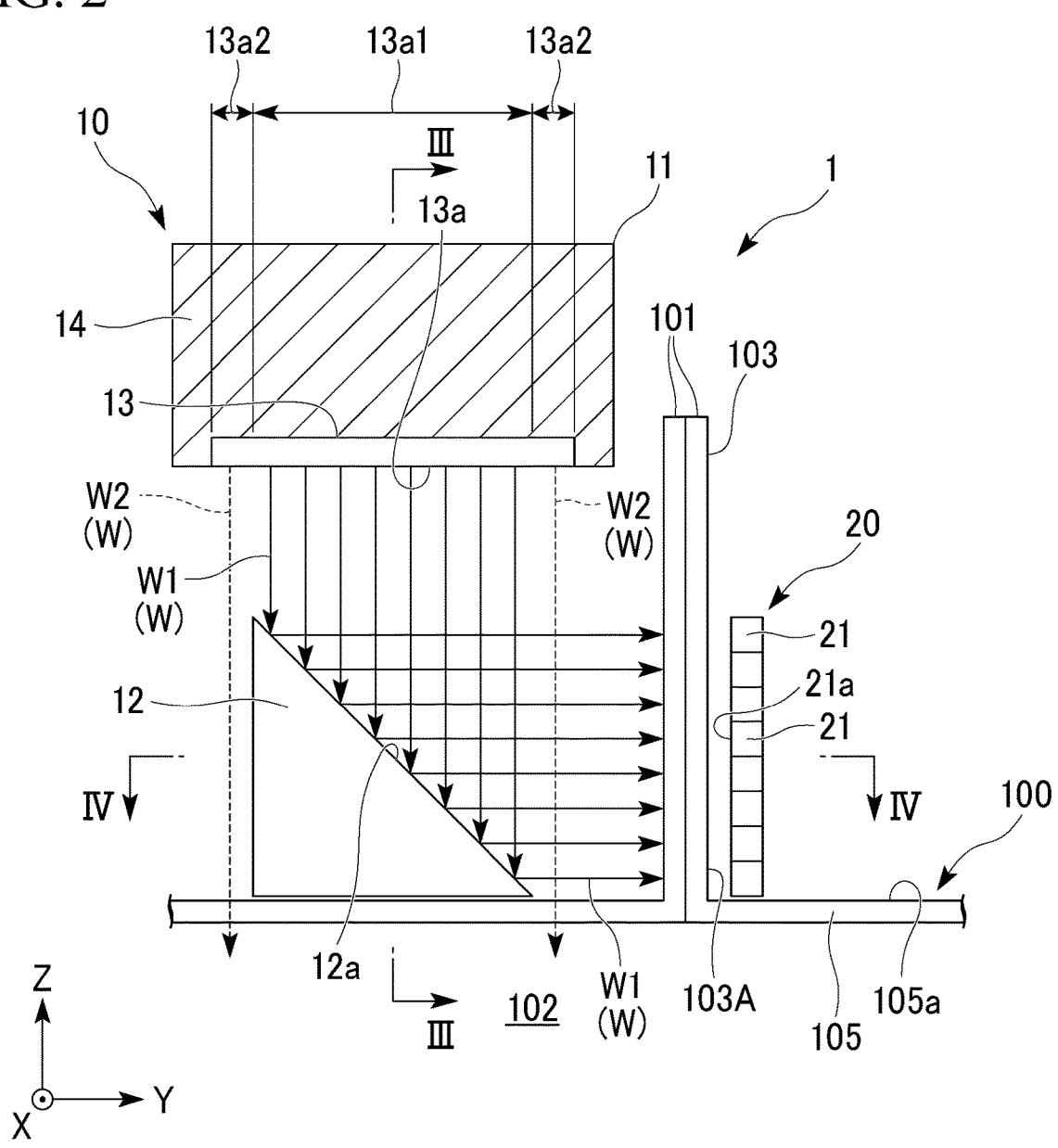
FIG. 2 is an enlarged cross-sectional view showing an enlarged main part of FIG. 1.

As shown in FIG. 1 and FIG. 2, the ultrasonic inspection device 1 includes a transmission unit (transmitter, emitter) 10 and a reception unit (receiver) 20.

The transmission unit 10 emits (irradiates) the ultrasonic waves W toward the joined portion 103 in a state in which the joined portion 103 of the packaging container 100 protrudes in a direction orthogonal to the outer surface 105a of the non-joined portion 105. The transmission unit 10 is configured so as to actively transmit the ultrasonic waves W particularly toward the base end portion 103A of the joined portion 103, positioned on the non-joined portion 105 side.

The transmission unit 10 of this embodiment has a transmission unit main body (transmission main bod) 11 and a mirror 12.

The transmission unit main body 11 is the part that transmits the ultrasonic waves W. The transmission unit main body 11 of this embodiment has a transmission element (irradiation element) 13 and a holding case 14. The transmission element 13 has a transmission surface (irradiation surface) 13a that transmits the ultrasonic waves W. The holding case 14 holds the transmission element 13 so that the transmission surface 13a of the transmission element 13 is exposed to the outside. The holding case 14 of this embodiment holds the transmission element 13 so as to cover the entire periphery of the transmission surface 13a. That is, the transmission surface 13a of the transmission element 13 is surrounded by a predetermined part of the holding case 14.

The mirror 12 reflects the ultrasonic waves W transmitted from the transmission unit main body 11. The mirror 12 is arranged so that the ultrasonic waves W reflected by the mirror 12 propagate toward at least the base end portion 103A of the joined portion 103. Moreover, the mirror 12 of the present embodiment reflects the beam-shaped ultrasonic waves W transmitted from an inner region 13a1 of the transmission surface 13a of the transmission unit main body 11 excluding a peripheral region 13a2. That is, the mirror 12 does not reflect the ultrasonic waves W2 transmitted from the peripheral region 13a2 of the transmission surface 13a, but reflects only the ultrasonic waves W1 transmitted from the inner region 13a1 of the transmission surface 13a to propagate toward the joined portion 103. The inner region

13a1 of the transmission surface 13a described above is a region where, for example, the intensity of the transmitted ultrasonic waves W1 is uniform. Further, the peripheral region 13a2 of the transmission surface 13a is, for example, a region where the intensity of the transmitted ultrasonic waves W2 is lower than the intensity of the ultrasonic waves W1 transmitted from the inner region 13a1.

Hereinafter, the transmission unit main body 11 and the mirror 12 of this embodiment will be described more specifically.

In this embodiment, the transmission unit main body 11 is arranged on one side of the joined portion 103 in the Y-axis direction (on the left side of the joined portion 103 in FIG. 1 and FIG. 2). Moreover, the transmission unit main body 11 is arranged so that when viewed from the X-axis direction, the ultrasonic waves W are transmitted from the transmission surface 13a of the transmission unit main body 11 in the opposite direction (Z-axis negative direction) to the protruding direction (Z-axis positive direction) of the joined portion 103 with respect to the non-joined portion 105.

The mirror 12 is arranged between the transmission unit main body 11 and the non-joined portion 105 in the Z-axis direction when viewed from the X-axis direction. A reflecting surface 12a of the mirror 12 that reflects the ultrasonic waves W is formed flat. The reflecting surface 12a of the mirror 12 faces the transmission surface 13a of the transmission unit main body 11 in the Z-axis direction, and faces the joined portion 103 in the Y-axis direction. Further, the reflecting surface 12a of the mirror 12 is inclined with respect to the transmission direction (Z-axis negative direction) of the ultrasonic waves W transmitted from the transmission surface 13a of the transmission unit main body 11, and the outer surface 105a of the non-joined portion 105. The inclination angle of the reflecting surface 12a is 45 degrees. The mirror 12 can be arranged with respect to the packaging container 100 so that its reflective surface 12a is positioned in close proximity to the outer surface 105a of the non-joined portion 105 in the Z-axis direction.

As a result, the ultrasonic waves W transmitted from the transmission surface 13a of the transmission unit main body 11 toward the mirror 12 are reflected by the reflection surface 12a of the mirror 12, so as to propagate toward the joined portion 103 in the Y axis positive direction, and are transmitted through the joined portion 103. Further, since the reflecting surface 12a of the mirror 12 is positioned in close proximity to the outer surface 105a of the non joined portion 105, the ultrasonic waves W reflected by the reflecting surface 12a can reach the base end portion 103A of the joined portion 103.

Figure 3:
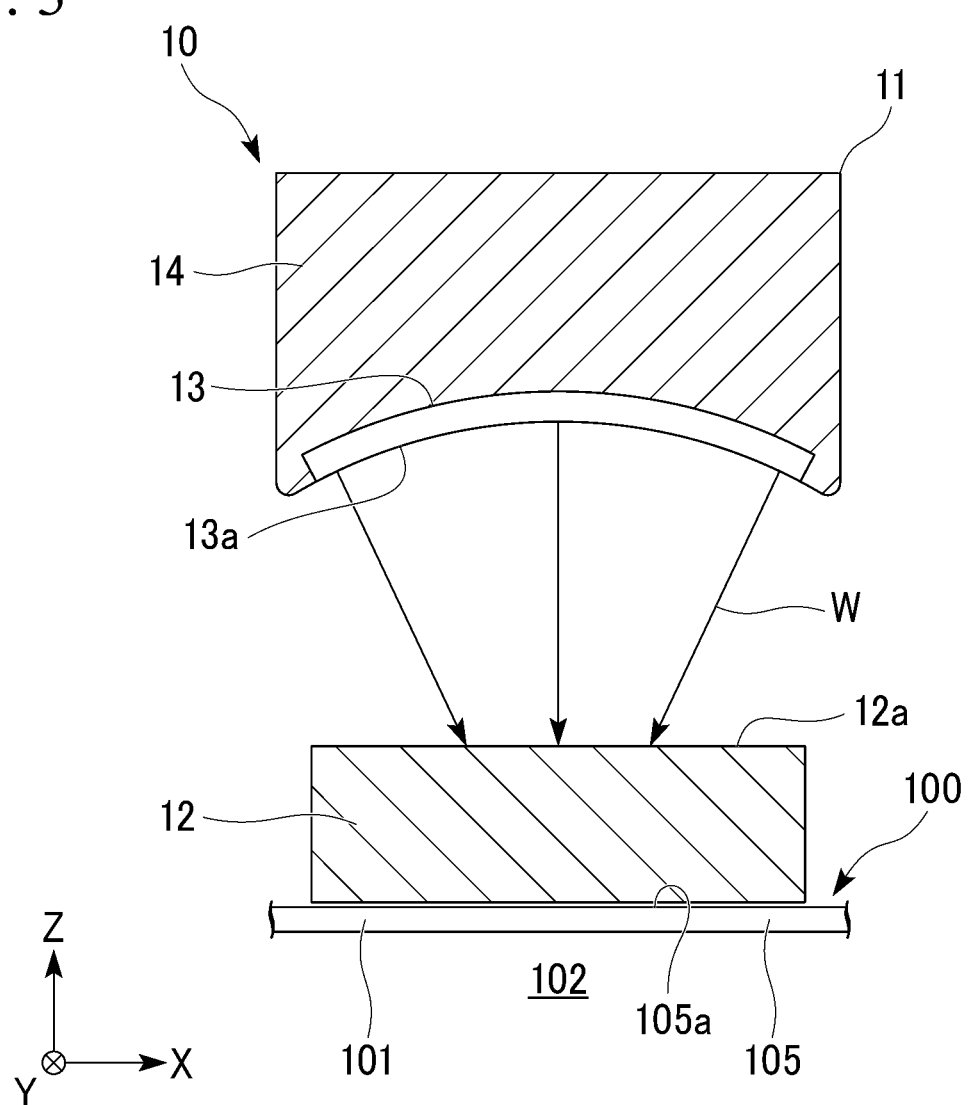
FIG. 3 is a cross-sectional view taken along line in FIG. 2.

The transmission surface 13a of the transmission unit main body 11 in the present embodiment is formed in an arcuate shape recessed in the Z-axis positive direction side when viewed from the Y-axis direction, as shown in FIG. 3. Further, the transmission surface 13a extends linearly in the Y-axis direction as shown in FIG. 2. Because of this, the shape of the transmission surface 13a viewed from the Y-axis direction does not change regardless of the position in the Y-axis direction. That is, the shape of the transmission surface 13a of this embodiment is similar to a portion of the inner peripheral surface of a cylinder in the circumferential direction.

With the transmission surface 13a formed as described above, the ultrasonic waves W transmitted from the transmission surface 13a of the transmission unit main body 11 converge (focus) in the X-axis direction as they go in the Z-axis negative direction as shown in FIG. 3, but do not converge in the Y-axis direction. As a result, in the absence of the mirror 12, the ultrasonic waves W transmitted from the transmission surface 13*a* of the transmission unit main body 11 become linear with a short length in the X-axis direction and a long length in the Y-axis direction at the converged position.

Figure 4:
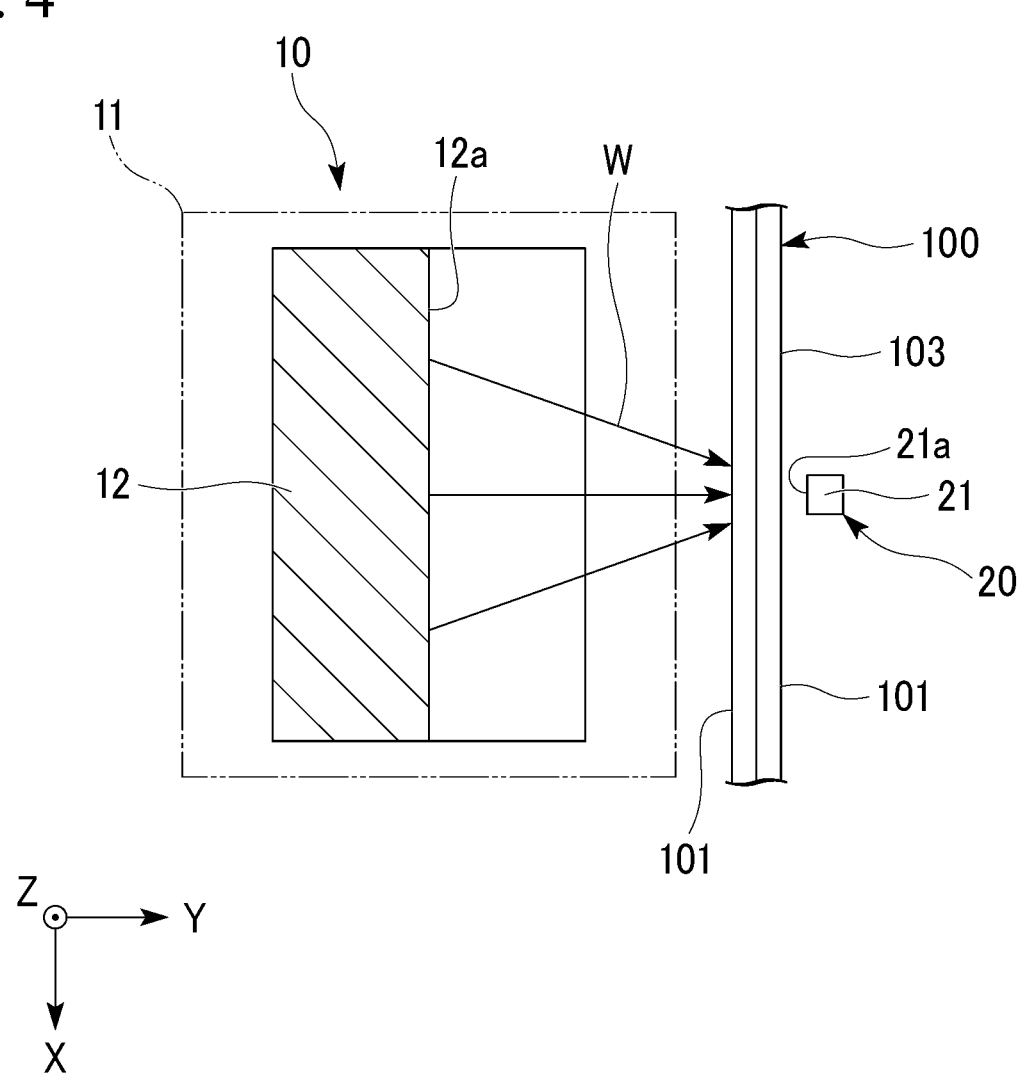
FIG. 4 is a cross-sectional view taken along line IV-IV in FIG. 2.

In this embodiment, the reflective surface 12*a* of the mirror 12 is positioned in front of the position where the ultrasonic waves W transmitted from the transmission unit main body 11 converge. Therefore, as shown in FIG. 4, the ultrasonic waves W reflected by the reflecting surface 12*a* of the mirror 12 and propagating in the Y-axis positive direction converge in the X-axis direction along the Y-axis positive direction and do not converge in the Z-axis direction. As a result, the ultrasonic waves W reflected by the reflecting surface 12*a* of the mirror 12 become linear with a short length in the X-axis direction and a long length in the Z-axis direction at the converged position.

As shown in FIG. 2, the reception unit 20 is arranged so that the joined portion 103 of the packaging container 100 is positioned between the transmission unit 10 and the reception unit 20 described above. The reception unit 20 receives the ultrasonic waves W having transmitted through the joined portion 103 of the packaging container 100. The reception unit 20 has a plurality of receivers 21. Each receiver 21 has a reception surface 21*a* that receives the ultrasonic waves W having transmitted through the joined portion 103 of the packaging container 100. It is preferable that the area of the reception surface 21*a* is small.

In this embodiment, as shown in FIG. 2 and FIG. 4, the plurality of receivers 21 are arranged in an array in a direction that intersects the direction (Y-axis positive direction) in which the ultrasonic waves W travel from the mirror 12 (transmission unit 10) to the joined portion 103 of the packaging container 100. Specifically, the plurality of receivers 21 are arranged in an array corresponding to the converged linear ultrasonic waves W as described above. That is, the plurality of receivers 21 are arranged in a row in the Z-axis direction.

The plurality of receivers 21 are not necessarily arranged strictly at the position where the ultrasonic waves W converge, but may be arranged for example at a position shifted away from the transmission unit 10 (Y-axis positive direction) from the position where the ultrasonic waves W converge. However, it is more preferable that the plurality of receivers 21 are arranged as close as possible to the position where the ultrasonic waves W converge. As illustrated in FIG. 4, when the ultrasonic waves W converge at or near the joined portion 103 of the packaging container 100, the plurality of receivers 21 are preferably arranged near the joined portion 103 in the Y-axis direction.

In the configuration illustrated in FIG. 1 and FIG. 2, the transmission unit 10 is arranged so that the ultrasonic waves W are transmitted only through the portion on the base end portion side of the joined portion 103 in the protruding direction. However, the arrangement of the transmission unit 10 is not limited to this example. The transmission unit 10 may be arranged, for example, so as to transmit through the entire area from the base end portion to the tip end portion of the joined portion 103 in the protruding direction. In this case, the reception unit 20 (the plurality of receivers 21) may be arranged from the base end portion to the tip end portion of the joined portion 103 in the protruding direction.

The ultrasonic inspection device 1 of the present embodiment receives and analyzes the ultrasonic waves W transmitted from the transmission unit 10 after transmitted through the joined portion 103 of the packaging container 100, in the reception unit 21, thereby being able to determine whether or not peeling of the container member 101 at the joined portion 103 has occurred.

Determination of the presence or absence of peeling at the joined portion 103 is performed, for example, by comparing the waveform of the ultrasonic waves W transmitted through the joined portion 103 to be inspected and received by the receiving portion 21 (the inspection target waveform), with the waveform of the ultrasonic waves W received by the receiving portion 21 after transmitted through the joined portion 103 where no peeling occurs (reference waveform). For example, a correlation value between the phase of the reference waveform and the phase of the waveform to be inspected is calculated, and if the correlation value is high, it is determined that peeling has not occurred at the joined portion 103, and if the correlation value is low, it is determined that peeling has occurred at the joined portion 103.

As described above, in the ultrasonic inspection device 1 of the first embodiment, the transmission unit 10 is configured to transmit (irradiate) the ultrasonic waves W toward at least the base end portion 103A of the joined portion 103 of the packaging container 100. As a result, the ultrasonic waves W can reach the base end portion 103A of the joined portion 103, and peeling of the container member 101 at the base end portion 103A of the joined portion 103 can be accurately inspected. Therefore, even in a condition where the joined portion 103 protrudes from the outer surface 105*a* (the surface of the predetermined object (object)) of the non-joined portion 105 in a direction orthogonal to the outer surface 105*a*, it is possible to accurately inspect the peeling of the container member 101 at the joined portion 103.

In addition, in the ultrasonic inspection device 1 of the present embodiment, the transmission unit 10 includes a transmission unit main body 11 that transmits (irradiates) the ultrasonic waves W, and a mirror 12 that reflects the ultrasonic waves W transmitted from the transmission unit main body 11. By reflecting the ultrasonic waves W transmitted from the transmission unit main body 11 by the mirror 12, the ultrasonic waves W can easily reach the base end portion 103A of the joined portion 103.

In addition, in the ultrasonic inspection device 1 of the present embodiment, the mirror 12 reflects the beam-shaped ultrasonic waves W transmitted (irradiated) from the inner region 13*a*1 of the transmission surface 13*a* of the transmission unit main body 11 excluding the peripheral region 13*a*2. This makes it possible to more accurately determine whether or not peeling has occurred at the joined portion 103. This point will be described below.

The intensity of the ultrasonic waves W2 transmitted from the peripheral region 13*a*2 of the transmission surface 13*a* may be lower than the intensity of the ultrasonic waves W1 transmitted from the inner region 13*a*1 of the transmission surface 13*a*. In this case, if the ultrasonic waves W are directly transmitted from the transmission surface 13*a* of the transmission unit main body 11 in the direction in which the container members 101 overlap, as in the conventional art, the intensity of the ultrasonic waves W reaching the base end portion 103A of the joined portion 103 is low, and it cannot be determined correctly whether or not peeling has occurred at the joined portion 103. In contrast, in the ultrasonic inspection device 1 of the present embodiment, the mirror 12 reflects the beam-shaped ultrasonic waves W transmitted from the inner region 13*a*1 of the transmission surface 13*a*. Therefore, the intensity of the beam-shaped ultrasonic waves W reflected by the mirror 12 is uniform. Accordingly, by propagating the ultrasonic waves W reflected by the mirror 12 and having uniform intensity, in the direction in which the container members 101 are overlapped, it is possible to correctly determine whether or not peeling has occurred at the joined portion 103.

In addition, in the ultrasonic inspection device 1 of the present embodiment, a plurality of receivers 21 having a reception surface 21*a* for receiving ultrasonic waves W, are arranged in an array in a direction that intersects the direction (Y-axis positive direction) in which the ultrasonic waves W travel toward the joined portion 103. Therefore, by reducing the area of the reception surface 21*a* of each receiving portion 21, it is possible to inspect the peeling of the container member 101 at the joined portion 103 (especially the base end portion 103A) with high accuracy. In addition, by arranging the receivers 21 in an array, the total area of the reception surface 21*a* can be increased. As a result, the entire joined portion 103 including the base end portion 103A can be inspected with high precision and in a short time.

In the first embodiment, the transmission unit main body 11 may be arranged so that at least the ultrasonic waves W transmitted from the transmission surface 13*a* of the transmission unit main body 11 are reflected by the mirror 12 and directed toward the joined portion 103 of the packaging container 100. Therefore, when viewed from the X-axis direction, the transmission unit main body 11 is not limited to transmitting the ultrasonic waves W from the transmission surface 13*a* of the transmission unit main body 11 toward the outer surface 105*a* of the non-joined portion 105 in a direction orthogonal to the outer surface 105*a* (Z-axis negative direction), and for example the arrangement may be such that the ultrasonic waves W are transmitted from the transmission surface 13*a* of the transmission unit main body 11 in a direction inclined with respect to the Z-axis direction.

In addition, the ultrasonic waves W reflected by the mirror 12 and directed to the joined portion 103 are not limited to propagating strictly in the Y-axis direction when viewed from the X-axis direction, but may propagate in a direction inclined with respect to the Y-axis direction, for example. The ultrasonic waves W reflected by the mirror 12 may be propagated for example with an inclination toward the Z-axis negative direction (that is, the base end portion 103A side of the joined portion 103) along the Y-axis direction toward the joined portion 103 when viewed from the X-axis direction. Even in such a case, the ultrasonic waves W transmitted from the transmission unit 10 can easily reach the base end portion 103A of the joined portion 103.

Figure 5:
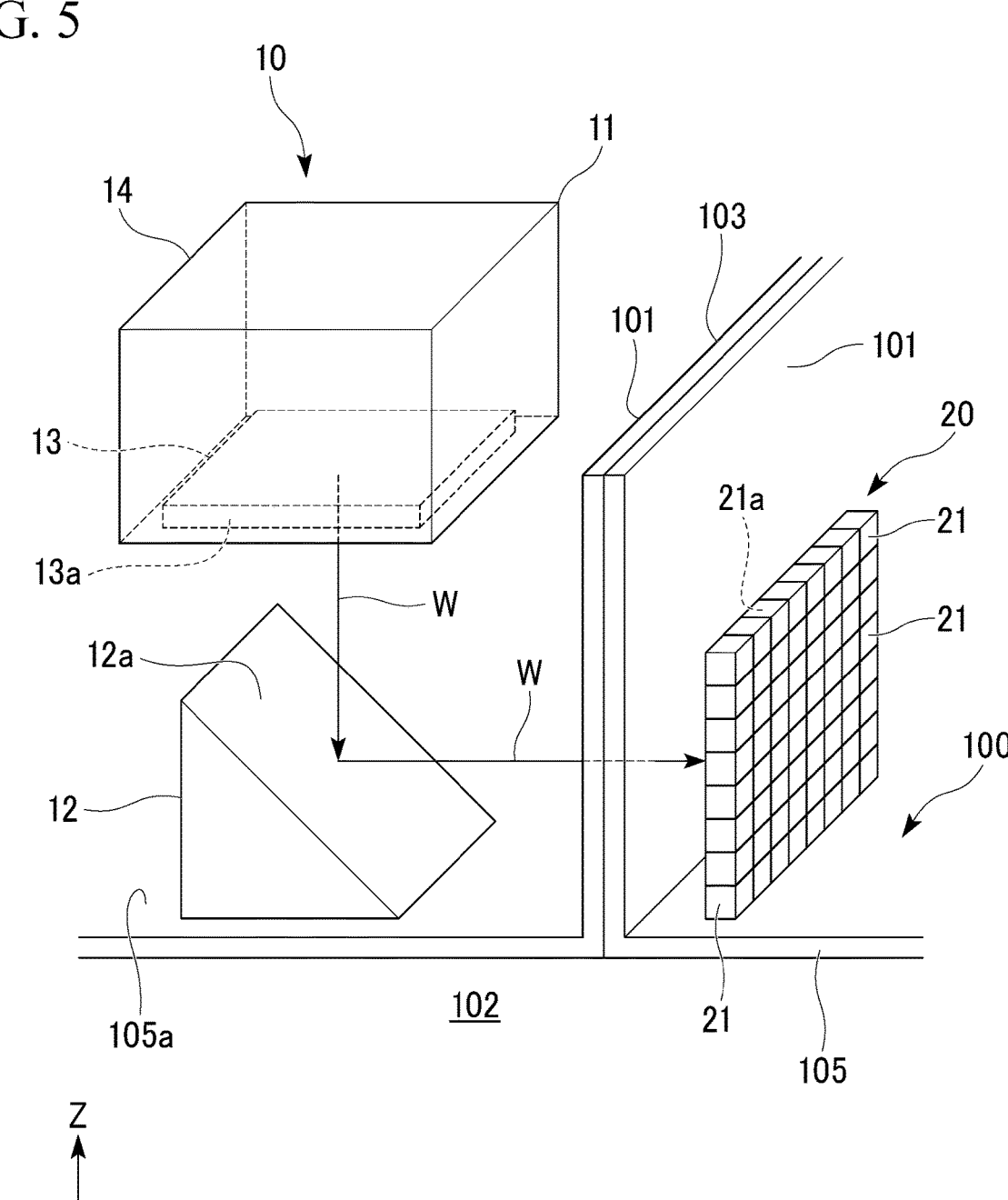
FIG. 5 is a perspective view schematically showing a modification example of an ultrasonic inspection device according to a first embodiment.

In the first embodiment, the transmission surface 13*a* of the transmission unit main body 11 may be a flat surface as shown in FIG. 5 for example. In this case, the ultrasonic waves W transmitted from the transmission surface 13*a* of the transmission unit main body 11 are reflected by the mirror 12 and propagate toward the joined portion 103 of the packaging container 100 without being converged. Therefore, the shape of the ultrasonic waves W orthogonal to the propagation direction (Y-axis positive direction) of the ultrasonic waves W from the mirror 12 toward the joined portion 103 is planar regardless of the position in the Y-axis direction.

In this case, the plurality of receivers 21 that constitute the reception unit 20 are arranged in a matrix corresponding to the planar ultrasonic waves W described above. That is, the plurality of receivers 21 are arranged in two directions (X-axis direction and Z-axis direction) orthogonal to the Y-axis direction. The plurality of receivers 21 may be positioned away from the joined portion 103 in the Y-axis direction, but are more preferably arranged as close to the joined portion 103 as possible in the Y-axis direction.

The configuration in which the plurality of receivers 21 are arranged in a matrix provides the same effect as when the plurality of receivers 21 are arranged in an array.

Figure 6:
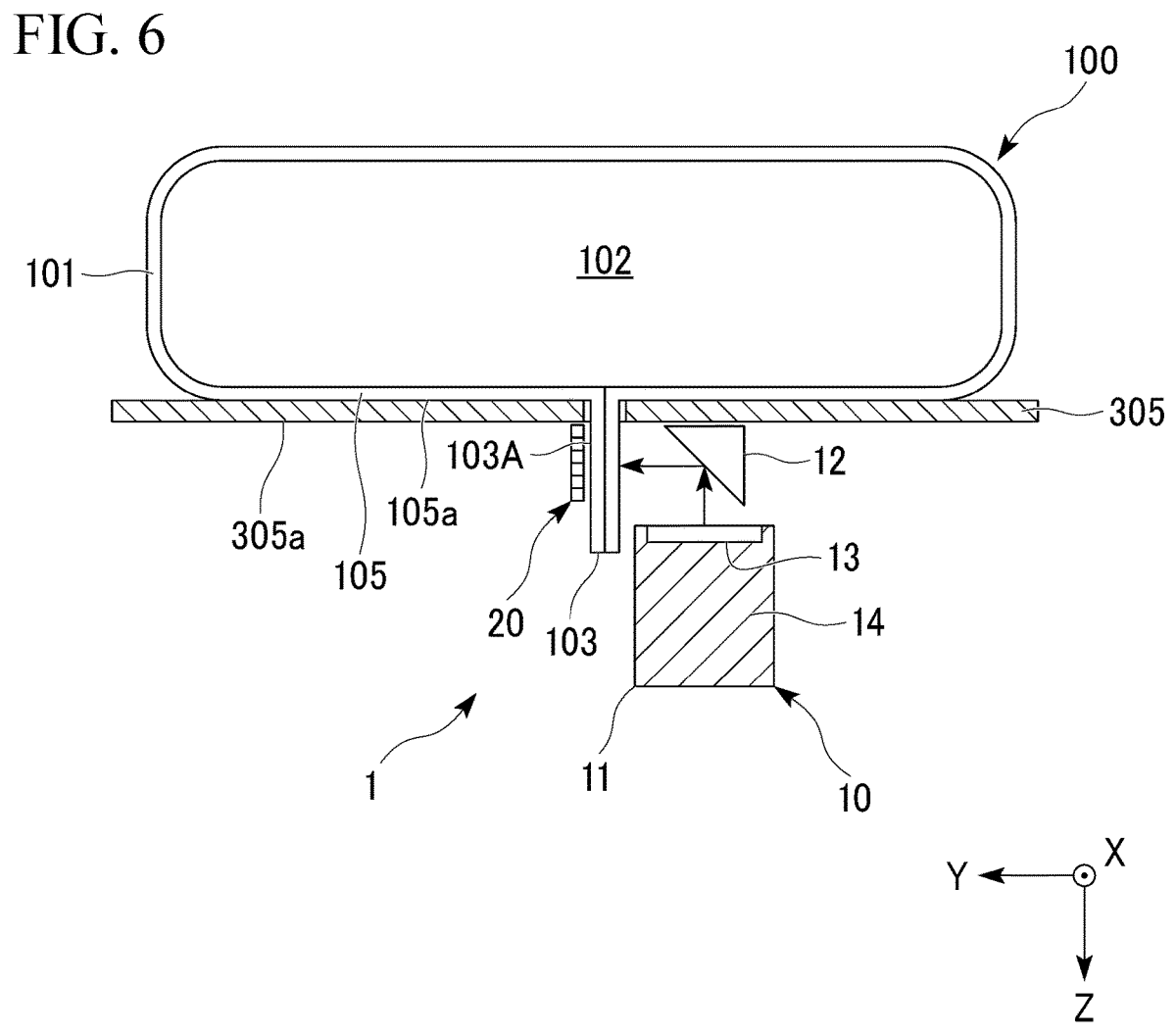

In the first embodiment, the joined portion 103 of the packaging container 100 to be inspected by the ultrasonic inspection device 1 is not limited to the portion protruding from the non-joined portion 105 of the packaging container 100, and for example, as shown in FIG. 6, it may be the portion that protrudes from a support base 305 that supports the packaging container 100. In this case, the joined portion 103 (especially the base end portion 103A) of the packaging container 100 to be inspected by the ultrasonic inspection device 1 is a portion that protrudes downward from the lower surface 305*a* (the surface of the predetermined object (object)) of the support base 305. The support base 305 is a base for supporting the packaging container 100 in, for example, an apparatus for manufacturing the packaging container 100 (for example, a pillow packaging machine) or an apparatus for transporting the packaging container 100.

Second Embodiment

Next, a second embodiment of the present disclosure will be described with reference to FIG. 7. In the second embodiment, components similar to those in the first embodiment are denoted by the same reference symbols, and descriptions thereof are omitted.

Figure 7:
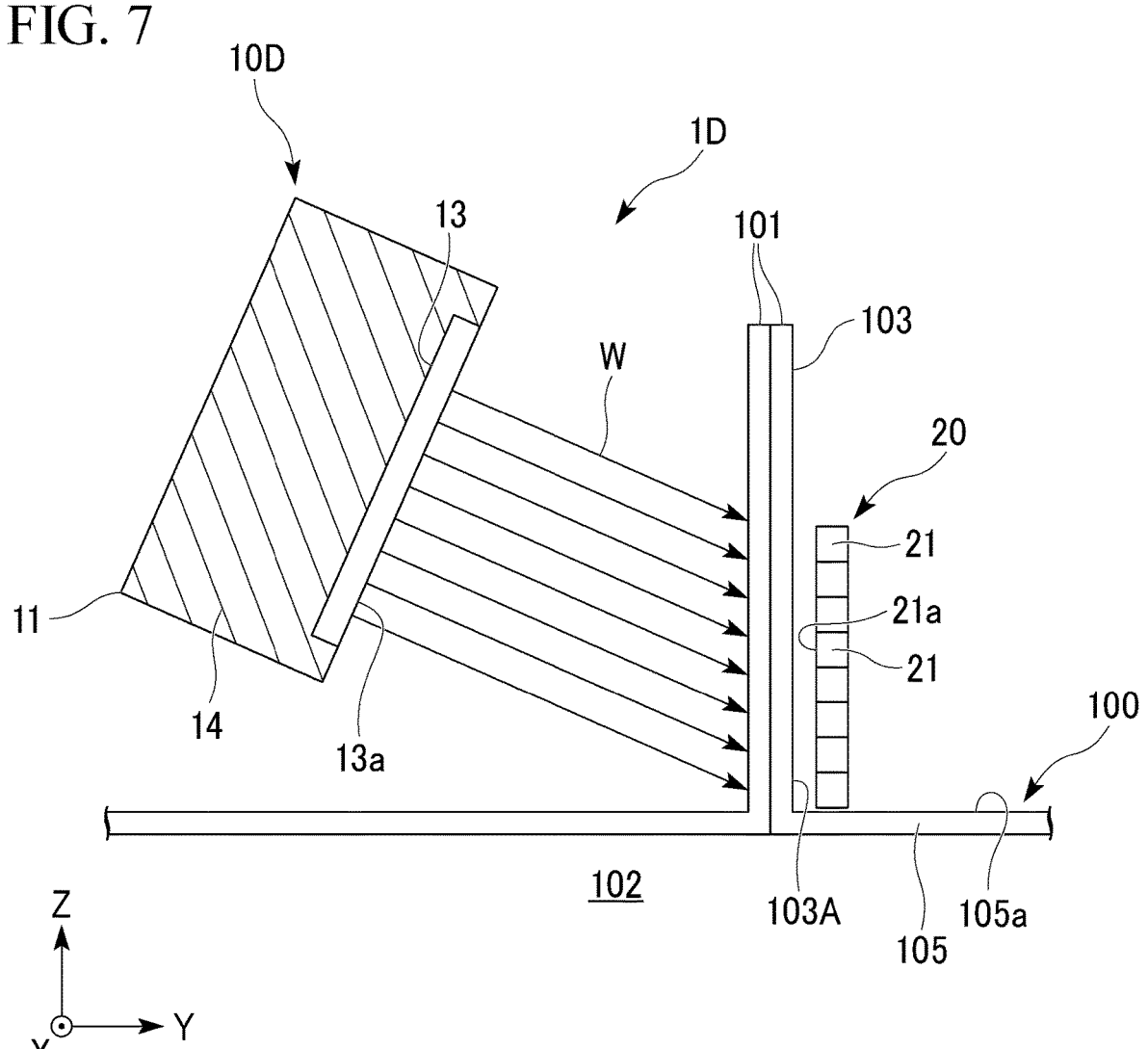
FIG. 7 is an enlarged cross-sectional view schematically showing a main part of an ultrasonic inspection device according to a second embodiment.

As shown in FIG. 7, an ultrasonic inspection device 1D of the second embodiment, as with the ultrasonic inspection device 1 of the first embodiment, includes a transmission unit 10D for transmitting ultrasonic waves W and a reception unit 20. The configuration of the reception unit 20 is the same as that of the first embodiment.

The transmission unit 10D of the second embodiment includes a transmission unit main body 11 similar to that of the first embodiment, but does not include a mirror 12 (see FIG. 2, etc.).

The transmission direction of the ultrasonic waves W transmitted from the transmission surface 13*a* of the transmission unit 10D is inclined in the Y-axis direction (the direction in which the container members 101 overlap) toward the Z-axis negative direction (the direction opposite to the protruding direction of the joined portion 103 with respect to the non-joined portion 105) as they go from the transmission unit 10D toward the joined portion 103. Specifically, the transmitting unit main body 11 of the transmission unit 10D is arranged in an inclined state so that the transmission surface 13*a* thereof faces the Y-axis positive direction side (joined portion 103 side) and the Z-axis negative direction side (outer surface 105*a* side of the non joined portion 105). As a result, the transmission direction of the ultrasonic waves W from the transmission unit 10D is inclined as described above.

The ultrasonic waves W transmitted from the transmission unit 10D need not reach the non-joined portion 105. Therefore, the transmission unit 10D is positioned in the Z-axis positive direction with a gap from the outer surface 105*a* of the non-joined portion 105, within a range where the ultrasonic waves W reach the base end portion 103A of the joined portion 103. Moreover, preferably the distance between the transmission unit 10D and the outer surface 105*a* of the non-joined portion 105 in the Z-axis direction is set, for example, so that the ultrasonic waves W transmitted from the inner region 13*a*1 (see FIG. 2) of the transmission surface 13*a* of the transmission unit 10D reach the base end portion 103A of the joined portion 103, and so that the ultrasonic waves W transmitted from the peripheral region 13a2 (see FIG. 2) of the transmission surface 13a do not reach the base end portion 103A of the joined portion 103.

According to the ultrasonic inspection device 1D of the second embodiment, the same effects as those of the first embodiment are obtained.

In addition, in the ultrasonic inspection device 1D of the second embodiment, the transmission direction (irradiation direction) of the ultrasonic waves W transmitted (irradiated) from the transmission unit 10D is inclined in the Y-axis direction (the direction in which the container members 101 overlap) toward the Z-axis negative direction (the direction opposite to the protruding direction of the joined portion 103 with respect to the non-joined portion 105) as they go from the transmission unit 10D toward the joined portion 103. Therefore, the ultrasonic waves W transmitted from the transmission unit main body 11 can easily reach the base end portion 103A of the joined portion 103. In particular, the ultrasonic waves W transmitted from the inner region 13a1 of the transmission surface 13a of the transmission unit 10D (that is, the ultrasonic waves W with uniform intensity) can easily reach the base end portion 103A of the joined portion 103.

Third Embodiment

Next, a third embodiment of the present disclosure will be described with reference to FIG. 8. In the third embodiment, components similar to those in the first and second embodiments are denoted by the same reference symbols, and descriptions thereof are omitted.

Figure 8:
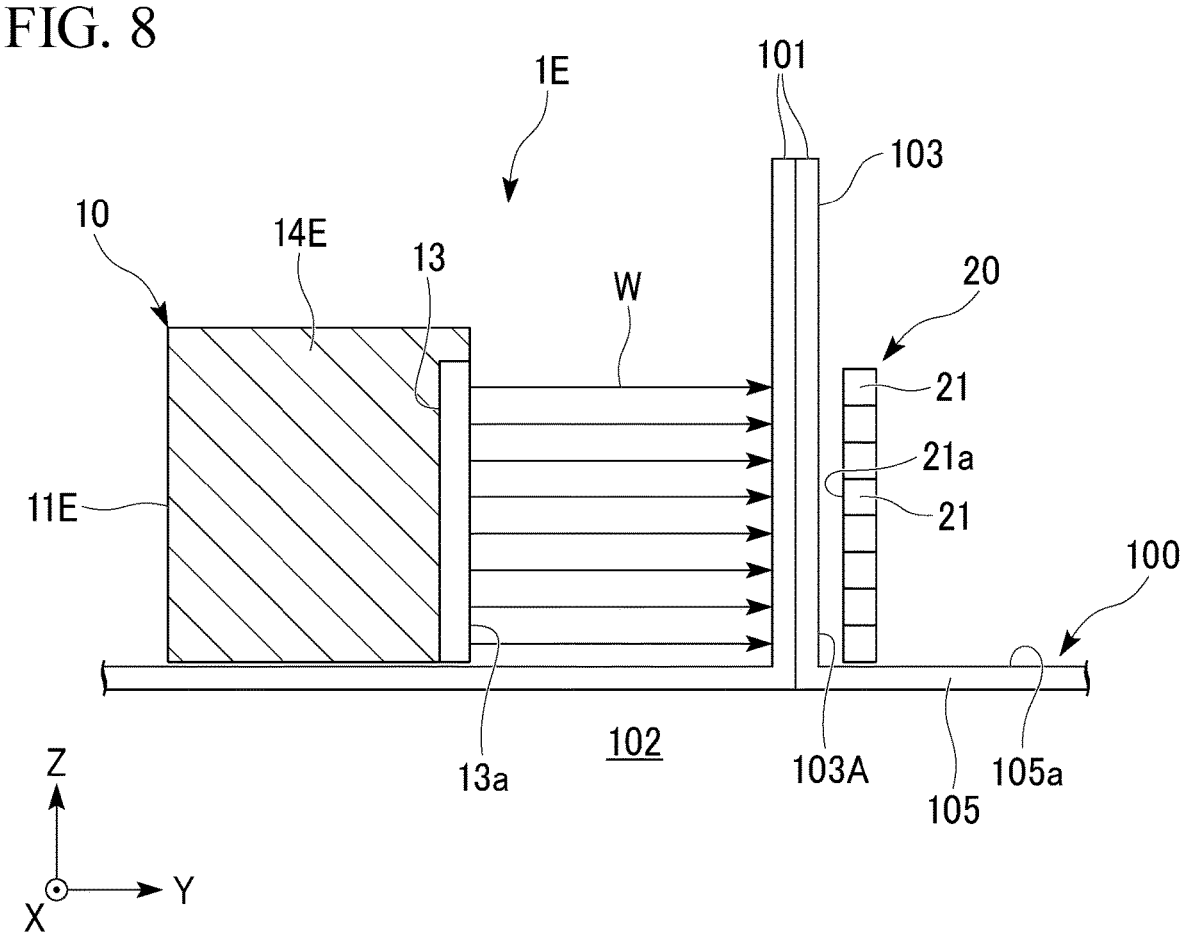
FIG. 8 is an enlarged cross-sectional view schematically showing a main part of an ultrasonic inspection device according to a third embodiment.

As shown in FIG. 8, an ultrasonic inspection device 1E of the third embodiment, as with the ultrasonic inspection devices 1 and 1D of the first and second embodiments, includes a transmission unit 10E for transmitting ultrasonic waves W and a reception unit 20. The configuration of the reception unit 20 is the same as that of the first embodiment.

The transmission unit 10E of the third embodiment, has a transmission unit main body 11E including a transmission element 13 and a holding case 14E, as with the second embodiment. However, the holding case 14E of the third embodiment holds the transmission element 13 so as to cover a part of the periphery of the transmission surface 13a of the transmission element 13. That is, on the transmission element 13 there is a portion of the periphery of the transmission surface 13a that is not covered with the holding case 14E. The holding case 14E may hold the transmission element 13 so as not to cover the entire periphery of the transmission surface 13a, for example.

In this embodiment, the transmission unit 10E is arranged so that the transmission direction of the ultrasonic waves W transmitted from the transmission surface 13a of the transmission unit 10E is in the Y-axis direction (the direction in which the container members 101 overlap). Further, the transmission unit 10E is arranged so that the portion of the periphery of the transmission surface 13a that is not covered by the holding case 14E, is positioned above the outer surface 105a of the non-joined portion 105 (above the surface of the predetermined object (object)). As a result, the ultrasonic waves W transmitted from the transmission unit 10E can easily reach the base end portion 103A of the joined portion 103 of the packaging container 100. This point will be described below.

When the transmission element 13 is held by the holding case 14 so as to cover the entire periphery of the transmission surface 13a, as in the transmitting unit main bodies 11 of the transmission units 10 and 10D shown in the first and second embodiments, then in the condition where the transmitting unit main body 11 is arranged above the outer surface 105a of the non-joined portion 105 (the surface of the predetermined object (object)) so that the transmission direction of the ultrasonic waves W is along the outer surface 105a of the non-joined portion 105, the transmission surface 13a is positioned apart from the outer surface 105a of the non-joined portion 105 by the amount of the holding case 14 that covers the periphery of the transmission surface 13a. For this reason, even if ultrasonic waves W are transmitted along the outer surface 105a of the non-joined portion 105 toward the joined portion 103, it is difficult for the ultrasonic waves W to easily reach the base end portion 103A of the joined portion 103.

On the other hand, in the third embodiment, the transmission unit main body 11E of the transmission unit 10E is arranged so that the portion of the periphery of the transmission surface 13a that is not covered by the holding case 14E is positioned above the outer surface 105a of the non-joined portion 105. Because of this, the periphery of the transmission surface 13a can be arranged closer to the outer surface 105a of the non-joined portion 105. Therefore, by transmitting the ultrasonic waves W toward the joined portion 103 along the outer surface 105a of the non-joined portion 105, the ultrasonic waves W can easily reach the base end portion 103A of the joined portion 103.

In the second and third embodiments described above, the transmission units 10D and 10E may be configured so as to converge the ultrasonic waves W onto a line extending in the Z-axis direction, as illustrated in FIG. 3 and FIG. 4 of the first embodiment. In this case, the plurality of receivers 21 may be arranged in an array so as to line up in the Z-axis direction. Further, these transmission units 10D and 10E may be configured so as not to converge the ultrasonic waves W, as illustrated in FIG. 5 of the first embodiment. In this case, the plurality of receivers 21 may be arranged in a matrix so as to line up in two directions (Z-axis direction and X-axis direction) orthogonal to the Y-axis direction.

Also, in the second and third embodiments, the joined portion 103 of the packaging container 100 inspected by the ultrasonic inspection devices 1D and 1E is not limited to the portion protruding from the non-joined portion 105 of the packaging container 100. The joined portion 103 may be a portion that protrudes from the support base 305 that supports the packaging container 100, as illustrated in FIG. 6 of the first embodiment.

Fourth Embodiment

Next, a fourth embodiment of the present disclosure will be described with reference to FIG. 9. In the fourth embodiment, components similar to those in the third embodiment are denoted by the same reference symbols, and descriptions thereof are omitted.

Figure 9:
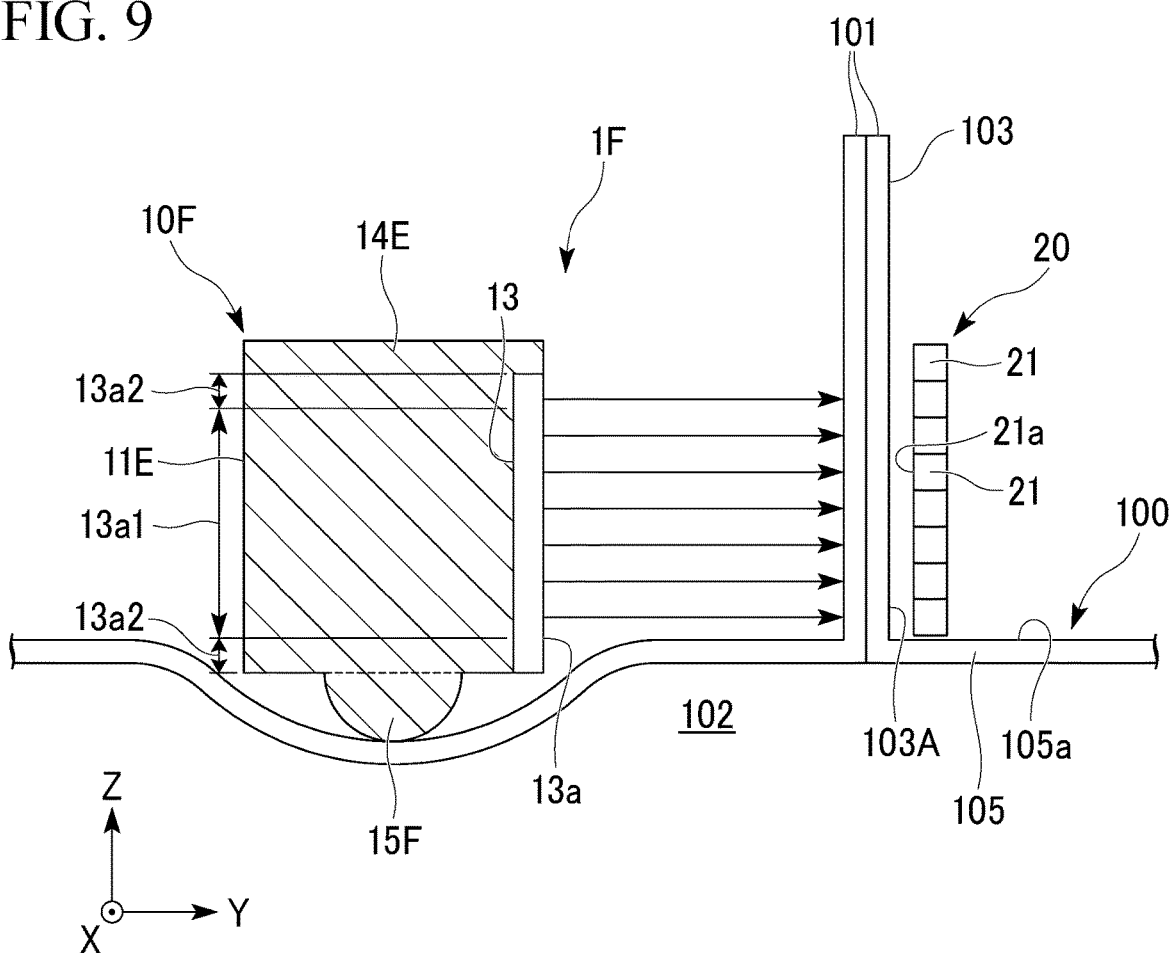
FIG. 9 is an enlarged cross-sectional view schematically showing a main part of an ultrasonic inspection device according to a fourth embodiment.

As shown in FIG. 9, the ultrasonic inspection device 1F of the fourth embodiment includes a transmission unit 10F for transmitting ultrasonic waves W and a reception unit 20, as with the ultrasonic inspection device 1E of the third embodiment. The transmission unit 10F of the fourth embodiment includes a transmission unit main body 11E including a transmission element 13 and a holding case 14E similar to those of the third embodiment. The transmission unit 10F of this embodiment further includes a protrusion 15F. The protrusion 15F protrudes outside the transmission surface 13a from a portion of the periphery of the transmission surface 13a that is not covered with the holding case 14E when viewed from the direction orthogonal to the transmission surface 13a (Y-axis direction). Also, the protrusion 15F is positioned to the rear side (Y-axis negative direction side) of the transmission element 13 (particularly, the transmission surface 13*a*). In FIG. 9, the protrusion 15F protrudes from the surface of the holding case 14E corresponding to the peripheral area of the transmission surface 13*a* that is not covered by the holding case 14E. The protrusion 15F illustrated in FIG. 9 is formed to have a circular cross-section. However, the shape of the protrusion 15F is not limited to the example of FIG. 9, and the shape of the protrusion 15F may be arbitrary.

In the fourth embodiment, as with the third embodiment, the transmission unit 10F is arranged so that the transmission direction of the ultrasonic waves W transmitted from the transmission surface 13*a* of the transmission unit 10F is the Y-axis direction (the direction in which the container members 101 overlap). Further, the transmission unit 10F is arranged so that the portion of the periphery of the transmission surface 13*a* that is not covered by the holding case 14E is positioned above the outer surface 105*a* of the non-joined portion 105 (above the surface of the predetermined object (object)). In this state, the protrusion 15F of the transmission unit 10F is pressed against the outer surface 105*a* of the non-joined portion 105.

According to the ultrasonic inspection device 1F of the fourth embodiment, the same effects as those of the third embodiment are obtained.

In addition, in the ultrasonic inspection device 1F of the fourth embodiment, the transmission unit 10F has the protrusion 15F that protrudes to outside the transmission surface 13*a* from a portion of the periphery of the transmission surface 13*a* that is not covered by the holding case 14E when viewed from the direction (Y-axis direction) orthogonal to the transmission surface 13*a*. This makes it possible to more accurately determine whether or not peeling has occurred at the base end portion 103A of the joined portion 103 of the packaging container 100. This point will be described below.

As described in the first embodiment, the intensity of the ultrasonic waves W transmitted from the peripheral region 13*a*2 of the transmission surface 13*a* may be lower than the intensity of the ultrasonic waves W transmitted from the inner region 13*a*1 of the transmission surface 13*a* positioned inside the peripheral region 13*a*2. In this case, if the transmission unit 10F is only arranged so that the portion of the periphery of the transmission surface 13*a* that is not covered by the holding case 14E is positioned above the outer surface 105*a* of the non-joined portion 105, then on the base end portion 103A of the joined portion 103, the weak ultrasonic waves W transmitted from the peripheral region 13*a*2 of the transmission surface 13*a* will reach the base end portion 103A of the joined portion 103. As a result, it may not be possible to correctly determine whether or not peeling has occurred at the joined portion 103.

On the other hand, in the configuration of the fourth embodiment described above, when the transmission unit 10F is arranged so that the portion of the periphery of the transmission surface 13*a* that is not covered by the holding case 14E is positioned on the outer surface 105*a* of the non-joined portion 105, the protrusion 15F allows the non-joined portion 105 to be pushed into the packaging container 100 (on the storage space 102 side). As a result, the ultrasonic waves W transmitted from the inner region 13*a*1 of the transmission surface 13*a* and having a uniform intensity can reach the base end portion 103A of the joined portion 103. Therefore, it is possible to more accurately determine whether or not peeling has occurred at the joined portion 103.

In the fourth embodiment, the protrusion 15F of the transmission unit 10F may protrude outside the transmission surface 13*a* from a portion of the periphery of the transmission surface 13*a* that is covered by the holding case 14E, for example, when viewed from the direction orthogonal to the transmission surface 13*a*. Also, the protrusion 15F of the fourth embodiment may be applied for example to the transmission units 10 and 10D of the first and second embodiments, which hold the transmission element 13 so that the holding case 14 covers the entire periphery of the transmission surface 13*a*. Even with the transmission unit having such a configuration, it is possible to more accurately determine whether or not peeling has occurred at the joined portion 103.

Although the present disclosure has been described in detail above, the present disclosure is not limited to the above embodiments, and various modifications can be made without departing from the scope of the present disclosure.

In the present disclosure, the plurality of receivers 21 are not limited to being arranged in a matrix form in which they are arranged vertically and horizontally without gaps, or arranged in an array form in which they are arranged in a linear direction without gaps, and may be arranged according to at least a predetermined pattern. The plurality of receivers 21 may be arranged in a pattern (for example, a lattice pattern or a checkered pattern) obtained by removing the receivers 21 from the matrix arrangement according to a predetermined rule, for example. Also, the plurality of receivers 21 may be arranged in a line along a curved line (for example, spiral). Further, the plurality of receivers 21 may be arranged in a pattern obtained by removing the receivers 21 according to a predetermined rule from a state in which the receivers 21 are arranged in a row without gaps (for example, a pattern in which a unit composed of two receivers 21 is arranged in a row with an interval).

In the present disclosure, the transmission unit may transmit ultrasonic waves so as to spread in a fan shape or a spherical shape, for example, as the distance from the transmission surface of the transmission unit increases.

Figure 10:
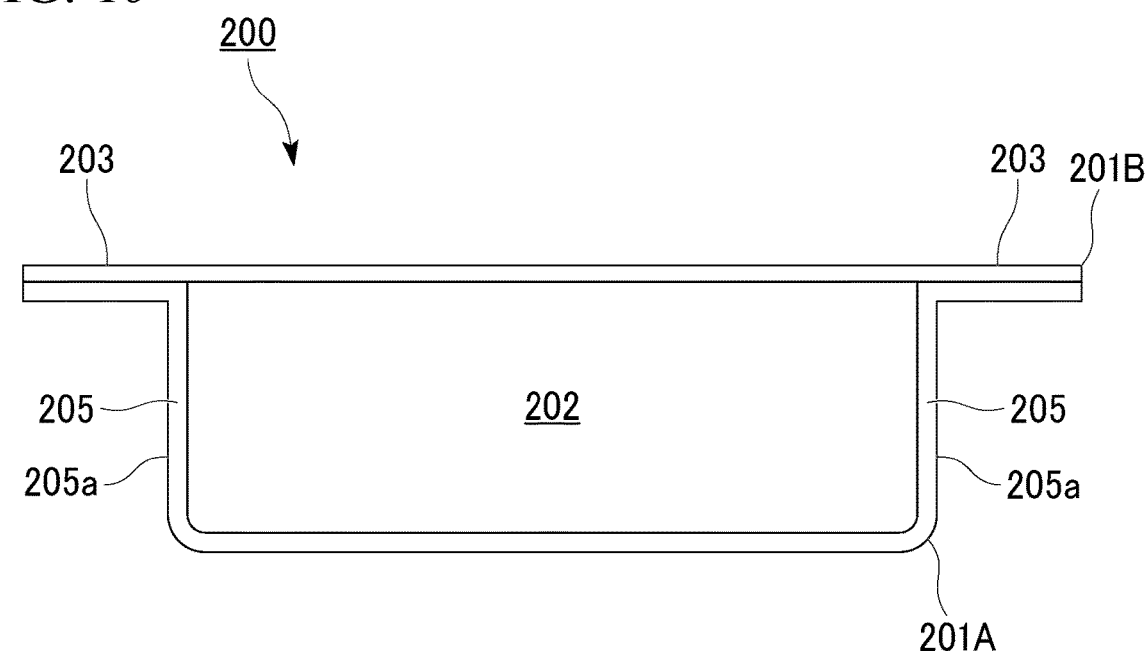
FIG. 10 is a cross-sectional view showing another example of a packaging container to be inspected by an ultrasonic inspection device according to the present disclosure.

The packaging container to be inspected by the ultrasonic inspection device according to the present disclosure is not limited to the packaging container 100 (see FIG. 1, etc.) consisting only of the sheet-shaped container member 101, but may be, for example, a cup-shaped container 200 shown in FIG. 10. The cup-shaped container 200 illustrated in FIG. 10 is a container in which a storage space 202 is formed inside by overlapping and joining a sheet-shaped member 201B, which is a second container member, to the open end of a cup-shaped member 201A, which is a first container member. In this cup-shaped container 200, a joined portion 203 between the open end of the cup-shaped member 201A and the sheet-shaped member 201B protrudes from the outer surface 205*a* (the surface of the predetermined object (object)) of the side wall portion 205 of the cup-shaped member 201A in a direction orthogonal to the outer surface 205*a*. The ultrasonic inspection device according to the present disclosure can inspect peeling between the cup-shaped member 201A and the sheet-shaped member 201B at the joined portion 203 where the open end of the cup-shaped member 201A and the sheet-shaped member 201B are overlapped and joined, in the cup-shaped container 200.

According to the present disclosure, it is possible to accurately inspect the peeling of a joined portion even when the joined portion of a packaging container (container member) protrudes from the surface of an object in a direction orthogonal to the surface.

The present disclosure may be applied to an ultrasonic inspection device.

What is claimed is:

1. An ultrasonic inspection device for inspecting a packaging container having a joined portion including overlapping and joined edges of the packaging container, comprising:

a transmitter configured to irradiate ultrasonic waves; and a plurality of receivers, each of the plurality of receivers having a reception surface configured to receive ultrasonic waves that have transmitted through the joined portion, wherein the transmitter comprises:

a transmission main body that irradiates the ultrasonic waves; and a mirror configured to reflect first ultrasonic waves irradiated from the transmission main body, wherein the transmission main body comprises an irradiation surface that irradiates the ultrasonic waves, the irradiation surface comprising an inner region that irradiates the first ultrasonic waves and a peripheral region disposed outside the inner region and that irradiates second ultrasonic waves, and wherein the mirror is arranged such that:

the mirror reflects the first ultrasonic waves irradiated from the inner region of the irradiation surface without reflecting the second ultrasonic waves irradiated from the peripheral region of the irradiation surface, and the first ultrasonic waves irradiated from the inner region of the irradiation surface and reflected by the mirror travel to at least a base end portion of the joined portion.

2. The ultrasonic inspection device according to claim 1, wherein the plurality of receivers are arranged in a matrix shape or in an array shape in a direction that intersects a direction in which the ultrasonic waves travel toward the joined portion.

3. The ultrasonic inspection device according to claim 1, wherein the mirror is arranged such that the second ultrasonic waves irradiated from the peripheral region of the irradiation surface and not reflected by the mirror pass between the mirror and the joined portion.

4. The ultrasonic inspection device according to claim 1, wherein the mirror is arranged such that the second ultrasonic waves irradiated from the peripheral region of the irradiation surface and not reflected by the mirror pass on opposite sides of the mirror from each other.

5. The ultrasonic inspection device according to claim 1, wherein the transmitter is configured to irradiate ultrasonic waves toward at least the base end portion of the joined portion in a state in which the joined portion protrudes from a surface of a non-joined part of the packaging container in a direction orthogonal to the surface.

6. The ultrasonic inspection device according to claim 1, wherein the transmitter is configured to irradiate ultrasonic waves toward at least the base end portion of the joined portion, the joined portion including an open end of a cup-shaped member joined together with a sheet-shaped member and protruding from an outer surface of a side wall portion of the cup-shaped member in a direction orthogonal to the outer surface.

7. The ultrasonic inspection device according to claim 1, wherein the transmitter is configured to irradiate ultrasonic waves toward at least the base end portion of the joined portion in a state in which the joined portion protrudes from a surface of a non-joined part of the packaging container in a direction orthogonal to the surface, and wherein the joined portion of the packaging container is a portion that protrudes downward from a lower surface of a support base that is a base for supporting the packaging container in an apparatus for manufacturing the packaging container or an apparatus for transporting the packaging container.

* * * * *